US008509087B2

(12) United States Patent
Rajagopalan et al.

(10) Patent No.: US 8,509,087 B2
(45) Date of Patent: Aug. 13, 2013

(54) PER-GRAPH LINK COST ASSIGNMENT IN LAYER 2 MULTIPATH NETWORKS

(75) Inventors: Santosh Rajagopalan, San Francisco, CA (US); Smita Rai, Mountain View, CA (US); Gayatri Ramachandran, Sunnyvale, CA (US); Sanjay Sane, Fremont, CA (US); Chandan Mishra, Sunnyvale, CA (US); Hariharan Balasubramanian, Oak Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 405 days.

(21) Appl. No.: 12/800,086

(22) Filed: May 7, 2010

(65) Prior Publication Data
US 2011/0273990 A1 Nov. 10, 2011

(51) Int. Cl.
*H04L 12/28* (2006.01)
(52) U.S. Cl.
USPC .......................................... 370/238; 370/389
(58) Field of Classification Search
USPC ................... 370/238.1, 238, 237, 236.1, 248, 370/252, 256, 389, 400, 401, 402, 351
See application file for complete search history.

(56) References Cited

U.S. PATENT DOCUMENTS

| 6,256,295 | B1 * | 7/2001 | Callon ........................... 370/254 |
| 6,757,286 | B1 * | 6/2004 | Stone ........................ 370/395.53 |
| 6,981,055 | B1 * | 12/2005 | Ahuja et al. ................... 709/238 |
| 7,076,594 | B2 * | 7/2006 | Benedetto et al. ............. 710/316 |
| 7,801,125 | B2 * | 9/2010 | Kreeger et al. ............... 370/389 |
| 7,864,712 | B2 * | 1/2011 | Khan et al. .................... 370/256 |
| 8,077,633 | B2 * | 12/2011 | Jain et al. ....................... 370/255 |
| 2006/0250961 | A1 * | 11/2006 | Vasseur .......................... 370/235 |
| 2008/0089247 | A1 | 4/2008 | Sane et al. |
| 2010/0061269 | A1 | 3/2010 | Banerjee et al. |

OTHER PUBLICATIONS

Donald Eastlake,3rd Eastlake Enterprises,Radia Perlman,Sun Microsystems,Dinesh Dutt,Cisco: "RBridges: Use of IS-IS;draft-eastlaketrill-rbridge-isis-02.txt",IETF,Nov. 3, 2008.
Perlman R Ed—Ross K et al: "Rbridges:transparent routing",Infocom2004.IEEE, Mar. 7, 2004.
IETF draft, "RBridges: Base protocol Specification", draft-ietf-trill-RBridge-protocol-14.txt, R. Perlman et al., Oct. 26, 2009.

* cited by examiner

*Primary Examiner* — Brenda H Pham
(74) *Attorney, Agent, or Firm* — Cindy Kaplan

(57) ABSTRACT

In one embodiment, a method includes assigning at a switch in a layer 2 multipath network, costs to a link in the network, each of the link costs associated with a different graph for forwarding traffic in the network, transmitting the link costs to other switches in the layer 2 multipath network, and receiving and forwarding traffic according to one of the graphs. An apparatus is also disclosed.

20 Claims, 5 Drawing Sheets

PER-GRAPH LINK COST ASSIGNMENT IN LAYER 2 MULTIPATH NETWORKS

BACKGROUND

The present disclosure relates generally to communication networks, and more particularly to Layer 2 Multipath (L2MP) networks.

Layer 2 MultiPath architectures include Data Center Ethernet (DCE) and TRansparent Interconnection of Lots of Links (TRILL). Data Center Ethernet is a collection of Ethernet extensions which provide enhancements to Classical Ethernet (CE) targeted for specific use in the data center. TRILL is an IETF (Internet Engineering Task Force) protocol implemented by devices referred to as Routing Bridges or RBridges (see, for example, RBridges: Base Protocol Specification, draft-ietf-trill-RBridge-protocol-14.txt, R. Perlman et al., Oct. 26, 2009). TRILL introduces new data and control planes for Ethernet networks.

In both DCE and TRILL deployments, the cost of a link is proportional to its bandwidth and is configurable on a per-link basis. This information can be communicated to peers of a switch using, for example, IS-IS (Intermediate System to Intermediate System). Limiting assignment of a link cost to a per-link basis in L2MP networks results in a number of drawbacks, including under utilization of links and complications for technologies such as Virtual Port Channel (vPC) at a junction between DCE and CE networks.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
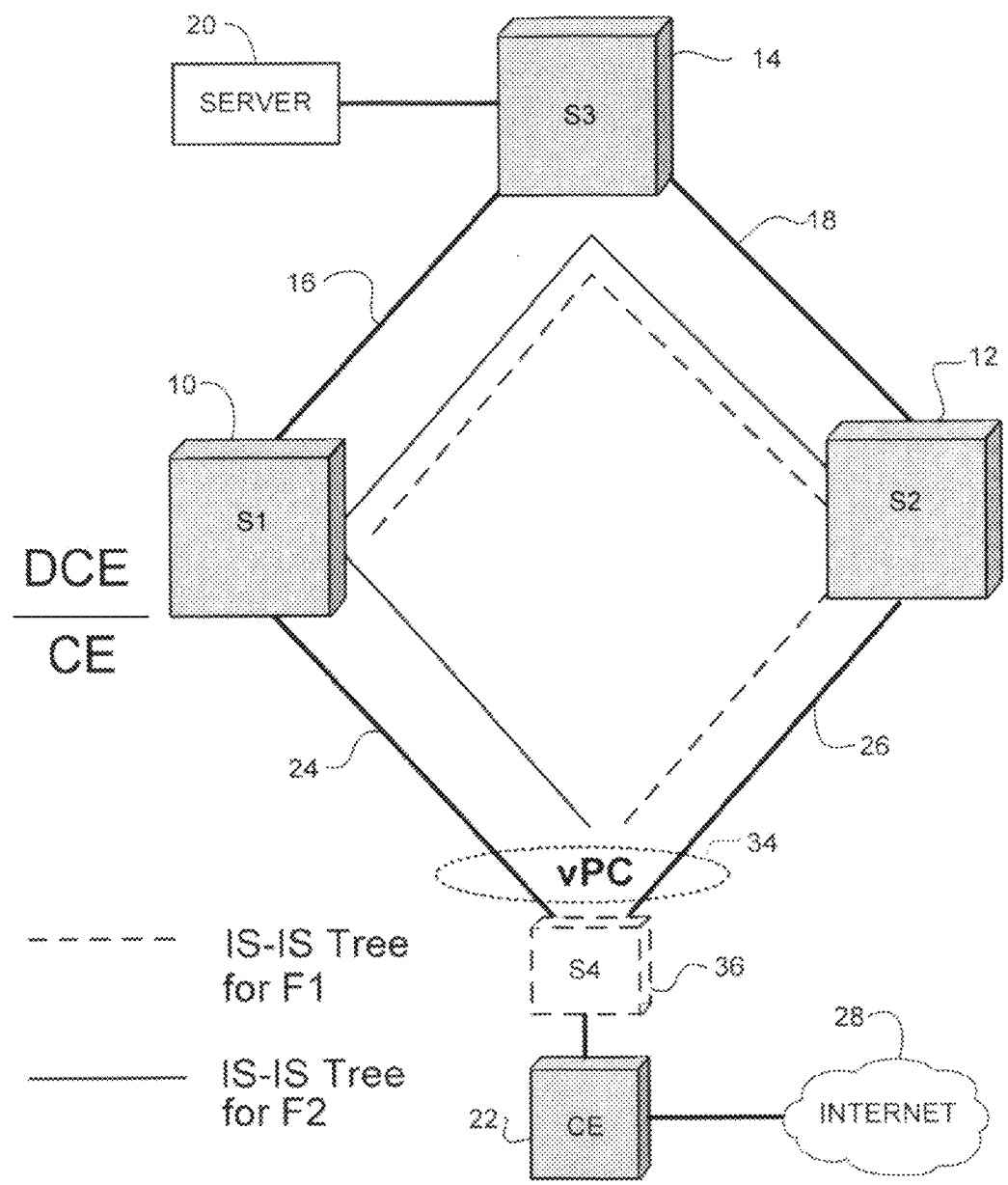
FIG. 1 illustrates an example of a network in which embodiments described herein may be implemented.

In one embodiment, a method generally comprises assigning at a switch in a layer 2 multipath network, costs to a link in the network, each of the link costs associated with a different graph for forwarding traffic in the network, transmitting the link costs to other switches in the layer 2 multipath network, and receiving and forwarding traffic at the switch according to one of the graphs.

In another embodiment, an apparatus generally comprises a processor for assigning at a switch in a layer 2 multipath network, costs to a link in the network, each of the link costs associated with a different graph for forwarding traffic in the network, transmitting the link costs to other switches in the layer 2 multipath network, and receiving and forwarding traffic according to one of the graphs. The apparatus further includes memory for storing the link costs for the graphs.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

The embodiments described herein support efficient multicast distribution in a Layer 2 MultiPath (L2MP) architecture through the use of a link-cost-per-graph constraint. In conventional networks, the cost of a link is proportional to its bandwidth and configurable on a per-link basis. It is desirable to assign a link different costs, each of the costs based on a graph in whose context the cost is being used. As described in detail below, the embodiments allow a link cost metric to be resolved at both a graph and link granularity rather than just a link granularity. The cost of a single link can therefore be different with respect to different graphs.

The embodiments may be used, for example, to allow network operators to partition traffic in different ways for different applications so that each application has its own graph with its own set of link costs. The cost of a link for a particular graph may be set based on a preference for the amount of traffic that should be carried on that link for that graph or to distribute traffic across available links, for example. The embodiments may also be used to provide optimal multicast forwarding for an emulated switch or Anycast by providing a different link-cost or link-affinity per graph. Other applications related to graph Traffic Engineering (TE) may also be supported by the embodiments.

A first example is described below in the context of a network with an emulated switch located at the interface between DCE (Data Center Ethernet) nodes and a CE (Classical Ethernet) node. A second example, in which different link costs are applied on a per-graph basis to distribute traffic across all available links, is described following the first example.

The embodiments operate in the context of a data communication network including multiple network devices. Some of the devices in the network may be switches, bridges, RBridges, or other network devices. The network device may include, for example, a master central processing unit (CPU), memory, interfaces, and a bus. In one embodiment, the network device is implemented on a general purpose machine as described below with respect to FIG. 5.

Referring now to the drawings, and first to FIG. 1, an example of a network in which embodiments described herein may be implemented is shown. The network includes switches S1 (10), S2 (12), and S3 (14) in a DCE architecture. The switches 10, 12, 14 may be, for example, NEXUS series switches, available from Cisco Systems, Inc., of San Jose, Calif., or any other layer 2 network device. Switches S1 and S3 are connected through link 16, and switches S2 and S3 are connected through link 18. Switch S3 may be connected to a server 20 or other network device. DCE switches 51 and S2 are connected to a non-DCE device, such as CE switch 22 via links 24 and 26. The CE device 22 may be connected to the Internet 28, for example.

It is to be understood that the simplified network shown in FIG. 1 is only an example and that the embodiments described herein may be implemented in networks having different network topologies and network devices, without departing from the scope of the embodiments. For example, the DCE network may be any network of layer 2 switches, while the non-DCE devices may be any network of devices that use a spanning tree or similar algorithm. Also, the network may include any layer 2 multipath architecture including, for example, TRansparent Interconnection of Lots of Links (TRILL).

A routing protocol, such as Intermediate System to Intermediate System (IS-IS), may be used at the DCE switches 10, 12, 14. The switches 10, 12, 14 using this routing protocol may append information to frames sent through the DCE nodes. This appended information may be in the form of a MAC-in-MAC header attached to the frame, for example. The CE switch 22 does not run the forwarding protocols supported by DCE, and does not append the MAC-in-MAC information. Instead the CE device 22 runs a variant of Spanning Tree Protocol (STP).

It is to be understood that IS-IS is used herein as one example and that other link state routing protocols (e.g., OSPF (Open Shortest Path First), EIGRP (Enhanced Interior Gateway Routing Protocol)) may be used without departing from the scope of the embodiments.

The DCE network uses Link State Protocols (LSPs) to learn multicast location and reachability information at layer 2. In one embodiment, IS-IS carries the per-graph link metric. The link metric is used to populate the databases used by the algorithms to compute the paths for each topology. The DCE network may contain any number of graphs. In the example shown in FIG. 1, the network includes two graphs (F1, F2) for providing multipath services. The multiple graphs provide load balancing for multi-destination traffic. It is to be understood that the term 'graph' as used herein may refer to a multicast graph, distribution tree, forwarding topology, forwarding tag, or other entity used for forwarding traffic in the network.

The two ports connected to links 24 and 26 form a Virtual Port Channel (vPC) 34, which groups the connections at CE device 22. Virtual port channels present an issue for MAC learning, since due to port channel load balancing (and the different ends being on different DCE switches), packets from the same CE cloud and the same source MAC can land on different DCE switches (10, 12), and may lead to MAC flip-flop on the other DCE node 14 as the node learns an address from one DCE switch and then from another DCE switch. In order to solve this problem, an emulated switch 36 is used behind the vPC, as illustrated in FIG. 1.

The emulated switch 36 effectively enables two different views to the two different sides (i.e., DCE side and CE side). Frames from the network of layer 2 switches destined to any port of the emulated switch 36 may take any of the links through any of the physical switches. The emulated switch 36 is viewed as being between DCE switches S1 and S2 and the CE device 22. For the CE side, it appears that the multiple links are a single port bundle (e.g., single EtherChannel). For the DCE side, the emulated switch 36 makes the multiple links appear as a single port of the emulated switch, which is physically connected to the multiple DCE switches 10, 12 that participate with the emulated switch. The emulated switch 36 may operate, for example, as described in U.S. Patent Application Publication No. 2008/0089247, "Multi-Chassis Emulated Switch", published Apr. 17, 2008, which is incorporated herein by reference in its entirety.

The emulated switch 36 introduces a complication since Incoming Interface Checks (IICs) need to be programmed correctly at the intermediate nodes 10, 12. IIC is an enforcement mechanism that ensures the packets following a tree do not 'leak' onto links which are not part of the tree. IIC uses the shortest path tree computed by the L2 routing protocol to restrict packets with a particular tree-ID from a particular source to ingress a single link on the switch. Thus, IIC ensures that on a particular tree, packets from a particular source only ingress on a particular link at the switch. Since packets originating from the emulated switch 36 can follow either link 16 from S1 to S3 or link 18 from S2 to S3, IIC for packets originating from the emulated switch cannot be programmed to accept from a single link and deny on another link for the node S3. The embodiment described below resolves this issue.

For technologies such as vPC, when multipathing is extended to Classical Ethernet switches at the junction between DCE and CE, the embodiments described herein may be used to provide a different link-cost (link-affinity) per graph at the DCE nodes 10, 12.

Referring again to the example shown in FIG. 1, IS-IS advertises different costs to reach the emulated switch S4 from the two emulating peers S1 and S2 on the two different graphs (IS-IS tree for F1, IS-IS tree for F2). This ensures that at least two graphs are provided for load balancing the multi-destination traffic. IS-IS advertises that the emulated switch S4 is reachable from switch S1 only on the graph corresponding to tree F2 and reachable from switch S2 only on the graph corresponding to tree F1. A link-affinity per graph may be used to associate a link with a specified graph (Forwarding Tag (FTag)). This allows other switches (e.g., S3) in the DCE network to program IIC appropriately. Switch S3 can accept packets from emulated switch S4 on link 16 only for graph F2, and link 18 only for graph F1. Ingressing packets from the CE vPC 34 on S1 and S2 are tagged with the appropriate graph.

In one embodiment, IS-IS carries link affinity information encoded as a type-length-value (TLV) element inside of the protocol. The DCE nodes inform other DCE nodes to partition reachability of the emulated switch S4 from S1 and S2 on different FTags. Switches S1 and S2 ensure that the correct ingress FTag is applied to packets from the CE vPC 34 so that packets are tagged with the appropriate graph.

The above example describes traffic from CE 22 to the DCE network. In order to prevent duplicate traffic for multi-destination packets from the DCE network to the CE node 22, the same graph partition may be used to elect a designated forwarder for the graph. For example, if packets are tagged with graph F2, only S1 forwards the packet to the vPC 34 (if peer S2 also has its vPC link up). If packets are tagged with graph F1, only S2 forwards the packet to CE device 22.

Figure 2:
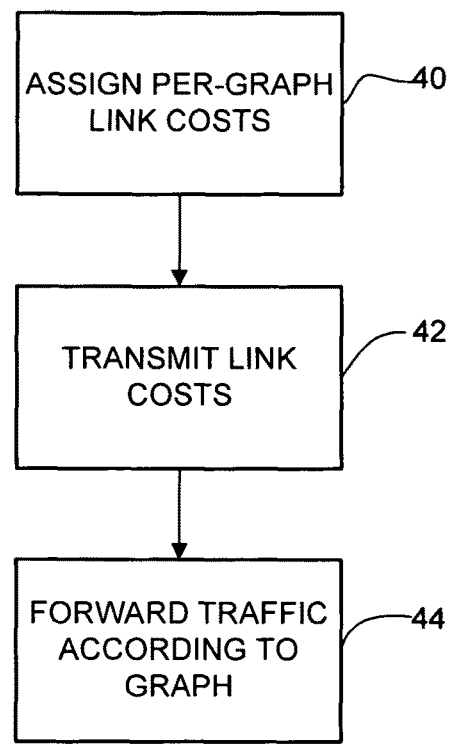
FIG. 2 is a flowchart illustrating an overview of a process for assigning a per-graph link cost in layer 2 multipath networks, in accordance with one embodiment

FIG. 2 is a flowchart illustrating an overview of a process for assigning a per-graph link cost in an L2MP network. The L2MP network refers to a plurality of nodes arranged in a layer 2 multipath capable architecture and may include, for example, a DCE network or a TRILL network. The term 'cost' as used herein refers to a metric applied to a link. At step 40, costs are assigned to a link in the network. Each of the link costs is associated with a different graph. The graph is used for forwarding traffic in the network and associated with a forwarding topology. The graph may be, for example, a multicast graph, distribution tree, or a forwarding tag. The link cost information may be in the context of an FTag (DCE network) or a tree rooted in an RBridge (TRILL network), for example. The cost may be assigned based on traffic preferences or on information received about the network topology (e.g., failure in the network), or in the case of an emulated switch, assigned so that traffic reaches two different emulating peers, for example. The cost assignment may be made at the switch in response to input by an administrator or other processing performed at the switch. The assignment may also be made based on link cost information received from another node in the network.

The per-graph link cost is transmitted to other switches in the network (step 42). The information may be transmitted to peer nodes in a routing protocol message (e.g., IS-IS packet), for example. In one embodiment, the routing protocol message is also used to transmit affinity information associating a node with a graph. The graph may be updated based on the link cost information. Traffic received at the switch is forwarded according to the graph (step 44).

As described above with respect to FIG. 1, the different link costs may be used to ensure that traffic is transmitted over at least two different paths in the network and allow for proper IIC programming so that a node can accept packets on different links from an emulated switch. As described with respect to the example below, the different costs may also be used to distribute traffic on different graphs across all available links to prevent under utilization of the links or take into account administrator preferences.

When more than one equal cost link is available between two switches, conventional implementations typically select the link to be used for the multicast graph algorithmically. Some link selection algorithms (e.g., ones that pick a link based on an ordering of the internal link index) may result in the same link being picked for all of the forwarding topologies. Other link selection algorithms may do a hash based rotation among the available links, but still do not enable explicit link preferences.

In the case where there is more than one link between two switches, an administrator (switch operator) can set the cost of one set of links to be high in one tree and low in the other tree, and the same for the other set of links. This distributes traffic on different graphs across all of the available links, taking into account the preferences of the switch operator. Also, the cost of a link for a particular tree may be set based on a preference for the amount of traffic that should be carried on that link for that tree. The per-graph link cost also allows an administrator to partition traffic in different ways for different applications. For example, each application can have its own graph with its own set of link costs.

Figure 3:
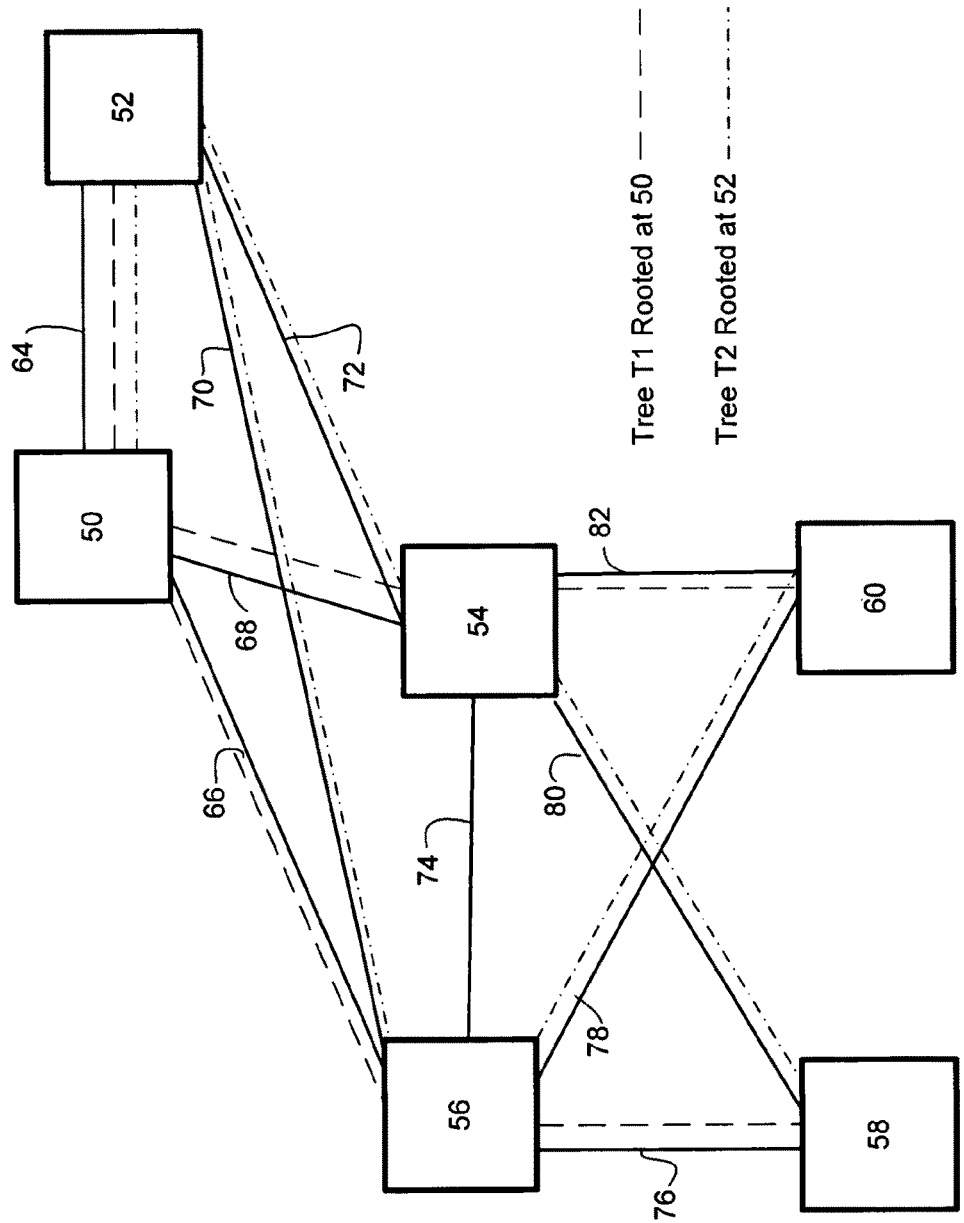
FIG. 3 illustrates another example of a network in which embodiments described herein may be implemented.

FIG. 3 illustrates a network comprising a plurality of switches 50, 52, 54, 56, 58, 60. Switch 50 connects to switch 52 via link 64, switch 54 via link 68, and switch 56 via link 66. Switch 52 connects to switch 54 via link 72 and switch 56 via link 70. Switch 56 connects to switch 54 via link 74, switch 58 via link 76, and switch 60 via link 78. Switch 54 connects to switch 58 via link 80 and switch 60 via link 82. Nodes 50 and 52 may be core switches in communication with edge switches 54, 56, for example.

As shown in FIG. 3, the network has two multicast graphs (T1, T2). The first tree T1 is rooted at node 50 and extends to node 58 through node 56, and node 60 through node 54. The second tree T2 is rooted at node 52 and extends to node 60 through node 56, and node 58 through node 54. The two trees are configured to provide optimum link utilization.

Figure 4:
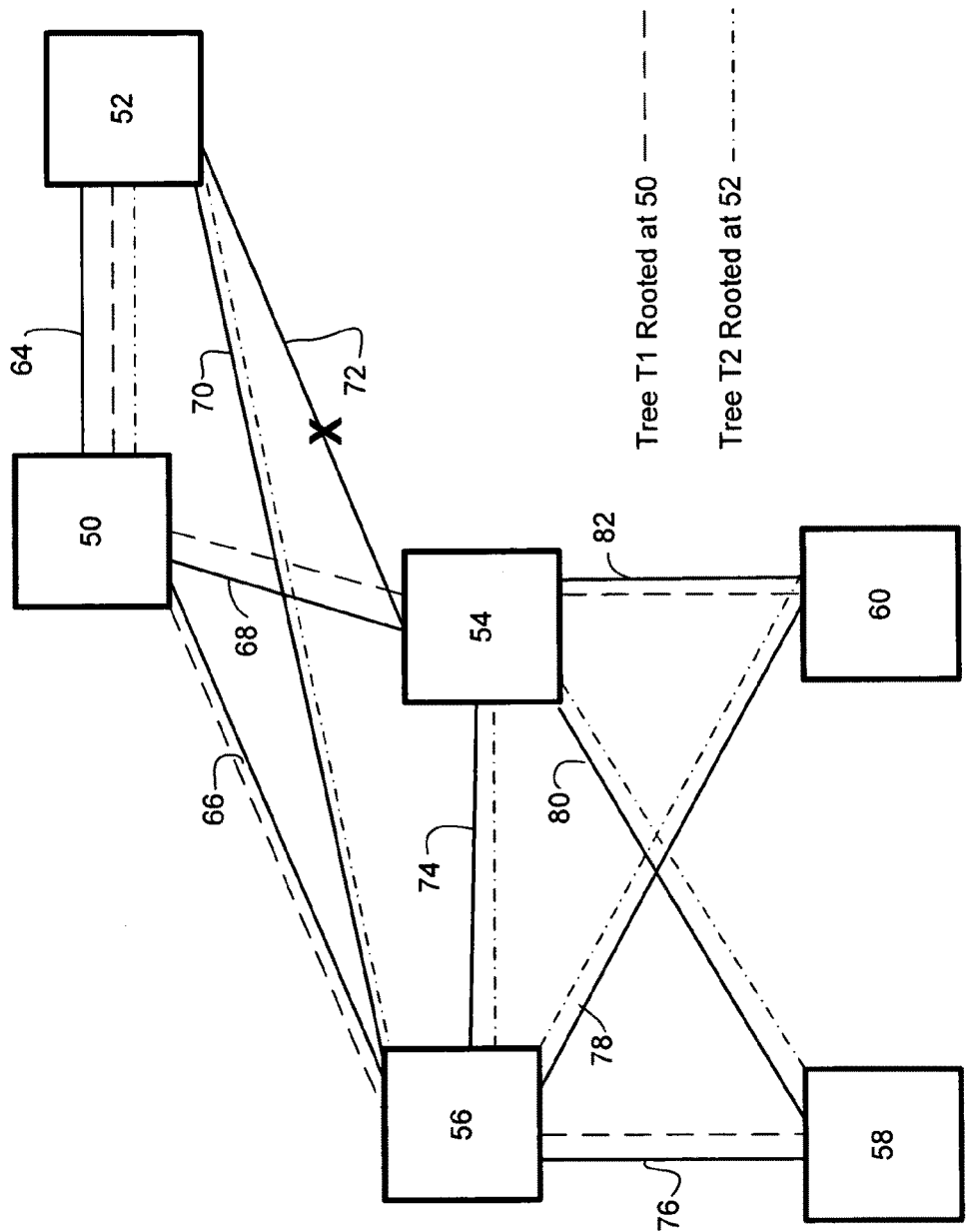
FIG. 4 illustrates a link failure in the network of FIG. 3.

FIG. 4 illustrates a failure between nodes 52 and 54 at link 72. In conventional networks, the trees are modified in response to the loss of link 72 such that both trees utilize link 76. This is because the shortest path to node 58 from both nodes 50 and 52 is via node 56, following the failure of link 72. This results in under utilization of link 80. The administrator would instead want to increase utilization of inter-switch link 74 and still use link 80 for tree T2. A link-cost-per-distribution-tree (or link-cost-per-nickname) TLV is used to increase the cost of link 76 only for tree T2. When the multicast SPF (Shortest Path First) calculations are performed, tree T2 will use links 74 and 80 instead of link 76, due to the high cost at link 76. The two different link costs at link 76 for each tree allow all of the links to be utilized. Multicast SPF runs are preferably different than unicast SPF calculations so that the new link-cost TLV does not affect unicast SPF.

Figure 5:
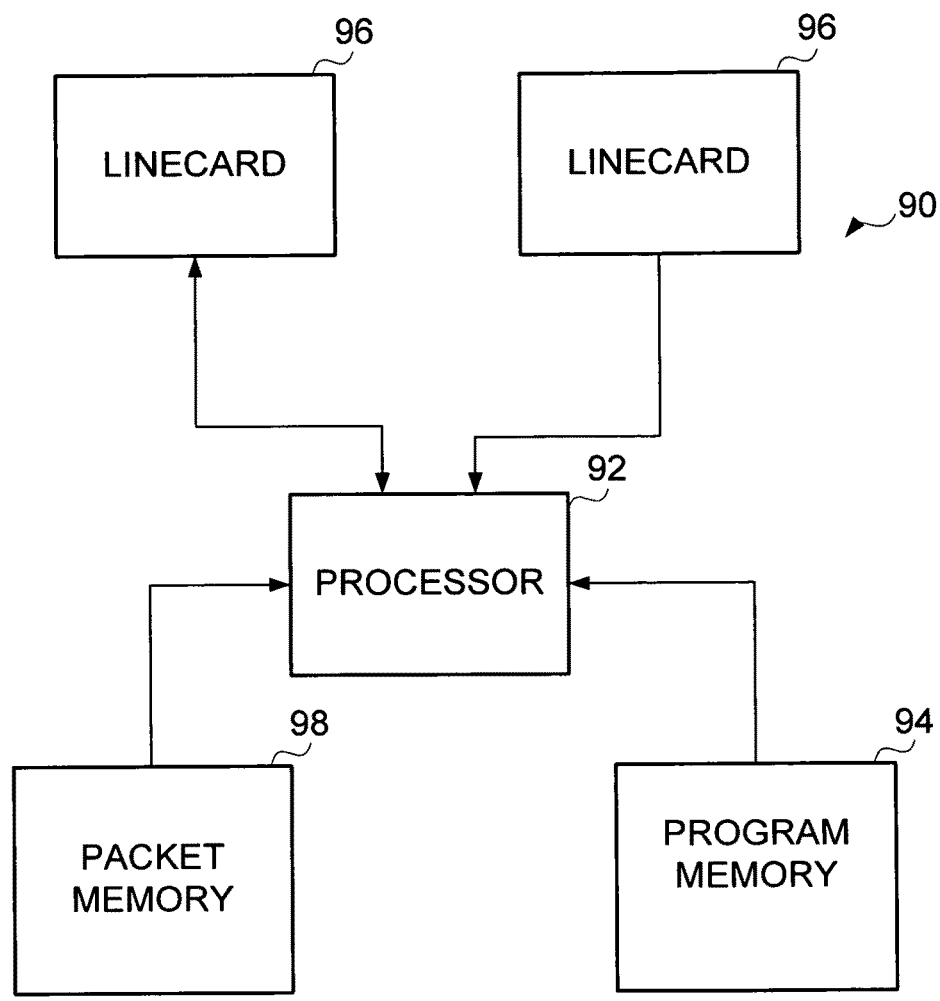
FIG. 5 depicts an example of a network device useful in implementing embodiments described herein.

FIG. 5 depicts a network device 90 (e.g., switch) that may be used to implement embodiments described herein. Network device 90 is configured to implement all of the network protocols and extensions thereof described above. In one embodiment, network device 90 is a programmable machine that may be implemented in hardware, software, or any combination thereof. Logic may be encoded in one or more tangible media for execution by a processor or multiple processors. For example, processor 92 may execute codes stored in a program memory 94. Program memory 94 is one example of a computer-readable medium. Program memory 94 can be a volatile memory. Another form of computer-readable medium storing the same codes is a type of non-volatile storage such as floppy disks, CD-ROMs, DVD-ROMs, hard disks, flash memory, etc.

Network device 90 interfaces with physical media via a plurality of linecards (network interfaces) 96. Linecards 96 may incorporate Ethernet interfaces, DSL interfaces, Gigabit Ethernet interfaces, 10-Gigabit Ethernet interfaces, SONET interfaces, etc. As packets are received, processed, and forwarded by network device 90, they may be stored in a packet memory 98. To implement functionality according to the system, linecards 96 may incorporate processing and memory resources similar to those discussed above in connection with the network device as a whole. It is to be understood that the network device 90 shown in FIG. 5 and described above is only one example and that different configurations of network devices may be used.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
    assigning at a switch in a layer 2 multipath network, costs to a link in the network, each of said link costs associated with a different graph for forwarding traffic in the network;
    transmitting said link costs to other switches in the layer 2 multipath network; and
    receiving and forwarding traffic at the switch according to one of said graphs, wherein an identifier associated with said graph is inserted into said traffic;
    wherein said link cost is assigned based on an amount of traffic to be carried on the link for said graph.

2. The method of claim 1 wherein at least one of the switches comprises a Data Center Ethernet (DCE) switch.

3. The method of claim 2 wherein receiving traffic comprises receiving a packet from an emulated switch located between the DCE switch and a Classical Ethernet (CE) device and further comprising inserting an identifier for said graph in the packet.

4. The method of claim 1 wherein transmitting said link costs comprises transmitting said link costs in an Intermediate System to Intermediate System (IS-IS) message.

5. The method of claim 1 wherein said identifier comprises a forwarding tag.

6. The method of claim 1 wherein said link costs comprise two link costs, each of said link costs different from said other link cost.

7. The method of claim 1 wherein said link cost is assigned to include one of the switches in one of said graphs.

8. An apparatus comprising:
   a processor for assigning at a switch in a layer 2 multipath network, costs to a link in the network, each of said link costs associated with a different graph for forwarding traffic in the network, transmitting said link costs to other switches in the layer 2 multipath network, and receiving and forwarding traffic according to one of said graphs; and
   memory for storing the link costs for said graphs;
   wherein receiving traffic comprises receiving a packet from an emulated switch and wherein the processor is further configured for inserting an identifier for said first graph in said packet.

9. The apparatus of claim 8 wherein at least one of the switches comprises a Data Center Ethernet (DCE) switch.

10. The apparatus of claim 9 wherein the emulated switch is located between the DCE switch and a Classical Ethernet (CE) device.

11. The apparatus of claim 8 wherein transmitting said link costs comprises transmitting said link costs in an Intermediate System to Intermediate System (IS-IS) message.

12. The apparatus of claim 8 wherein the processor is further configured to insert a forwarding tag associated with said graph into traffic received at the apparatus.

13. The apparatus of claim 8 wherein said link cost is assigned based on an amount of traffic to be carried on the link for said graph.

14. The apparatus of claim 8 wherein said link cost is assigned to include one of the switches in one of said graphs.

15. The apparatus of claim 8 wherein assigning a cost to the link for one of said graphs comprises assigning a high cost to the link for said graph and assigning a low cost to the link for another of said graphs to distribute traffic across available links in the network.

16. One or more non-transitory computer readable media encoded thereon instructions which when executed by a computer cause the computer to:
   assign in a layer 2 multipath network, costs to a link in the network, each of said link costs associated with a different graph for forwarding traffic in the network; and
   transmit said link costs to switches in the layer 2 multipath network, wherein received traffic is forwarded according to one of said graphs;
   wherein assigning a cost to the link for one of said graphs comprises assigning a high cost to the link for said graph and assigning a low cost to the link for another of said graphs to distribute traffic across available links in the network.

17. The logic of claim 16 wherein said link cost is assigned based on an amount of traffic to be carried on the link for said graph.

18. The logic of claim 16 wherein said link cost is assigned to include one of the switches in said graph.

19. The logic of claim 16 wherein transmitting said link costs comprises transmitting said link costs in an Intermediate System to Intermediate System (IS-IS) message.

20. The logic claim 16 further comprising logic operable to insert a forwarding tag associated with said graph into traffic received at the switch.

* * * * *